(12) United States Patent
Abraham et al.

(10) Patent No.: US 6,268,915 B1
(45) Date of Patent: Jul. 31, 2001

(54) MICROPOLARIMETER

(76) Inventors: Michael Abraham, Am Kühborn 5, Mainz, 55129; Matthias Eberhardt, Kelternweg 183, Ulm 89075, both of (DE)

(*) Notice: Subject to any disclaimer, the term of this patent is extended or adjusted under 35 U.S.C. 154(b) by 0 days.

(21) Appl. No.: 09/485,111
(22) PCT Filed: Aug. 6, 1997
(86) PCT No.: PCT/EP97/04291
§ 371 Date: Feb. 3, 2000
§ 102(e) Date: Feb. 3, 2000
(87) PCT Pub. No.: WO99/08081
PCT Pub. Date: Feb. 18, 1999

(51) Int. Cl.[7] .................................................. G01J 4/00
(52) U.S. Cl. ........................ 356/367; 356/322; 356/327
(58) Field of Search ................................. 356/367, 322, 356/327

(56) References Cited

U.S. PATENT DOCUMENTS 4,286,843  9/1981  Reyblatt .

FOREIGN PATENT DOCUMENTS

| 44 42 400 | 6/1996 | (DE) . |
|---|---|---|
| 195 47 553 | 3/1997 | (DE) . |
| 352 133 | 1/1990 | (EP) . |
| 632 256 | 1/1995 | (EP) . |

*Primary Examiner*—Frank G. Font
*Assistant Examiner*—Reginald A. Ratliff
(74) *Attorney, Agent, or Firm*—Hudak & Shunk Co., L.P.A.

(57) ABSTRACT

The invention concerns a micropolarimeter comprising an analyzer (1) and a detector (10) located past the analyzer in the direction of radiation and presenting a number of segments $N_D$ which is higher than or equal to 3 (11). The invention seeks to provide a micropolarimeter with no moving parts, with a high polarization index, for use for polychromatic light, so small that it can detect the ray of common lasers in one single measurement step without it being necessary to enlarge it, and capable of being converted in a simple manner into a complete Stokesmeter. To that end, the analyzer (1) consists of a radially symmetrical flat disk (5) produced in a polarizing material with which the polarization rests on absorption effects inside said material, the surface of the analyzer (1) being greater than or equal to the surface of the detector segments (10)

26 Claims, 11 Drawing Sheets

MICROPOLARIMETER

BACKGROUND OF THE INVENTION

Figure 1A:
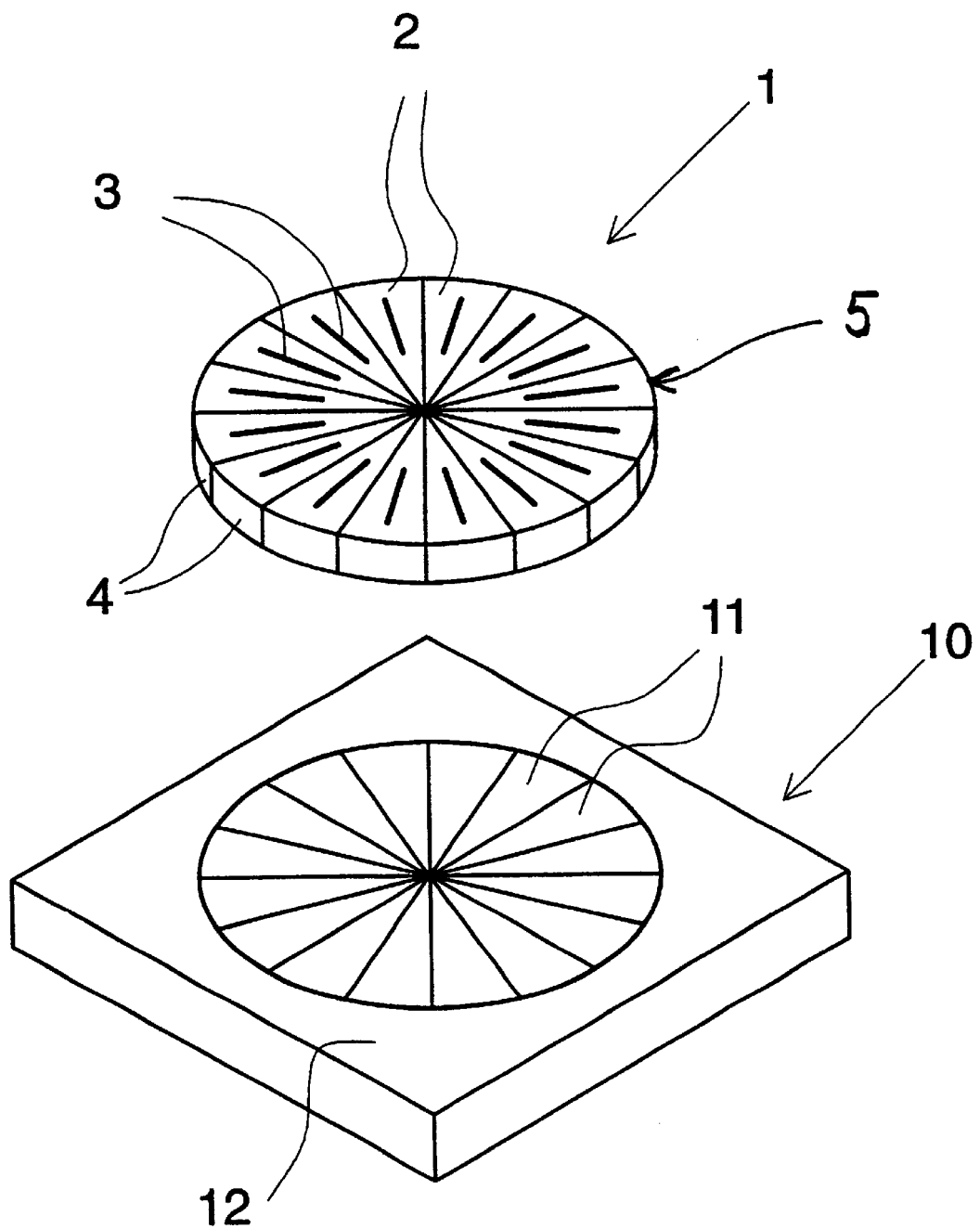

The invention concerns a micropolarimeter comprising an analyzer and a detector located past the analyzer and presenting a number of segments $N_0$.

In the state of the art, light is used as a contactless and non-destructive probe for measuring a wide variety of sample properties. For this purpose the change of the characteristic properties of the radiation after interaction with the sample is used; for example, reflection or transmission. In contrast, in polarimetry and ellipsometry, the information contained in the polarization properties or its changes due to interaction with the sample is used.

In the case of completely polarized light, this information is the ellipticity, the position of the major axis of the polarization ellipse in space (azimuth) and the sense of rotation of the field strength vector. In the case of partially polarized light, the degree of polarization is added. These quantities are measured completely by the four elements of the Stokes vector, the so-called Stokes parameters (see R. M. Azzam, Bashara, Ellipsometry and Polarized Light, North Holland, Amsterdam, 1988). Devices for measuring the parameters of polarized light are called polarimeters. A wide variety of measuring tasks may be performed by means of completely polarized light whereby the sense of rotation of the field strength vector does not need to be known. In this case, it is sufficient to determine ellipticity and azimuth.

To determine components of the Stokes vector, devices with mechanically moving analyzers or phase shifters (retarders) are frequently used. Systems with moving parts always have the disadvantage of being slow, susceptible to malfunctions, expensive and relatively large. This is particularly disadvantageous in process control applications: high measuring accuracy, reliability, cost efficiency and flexibility play an increasingly important role in the installation in production lines. EP 0 632 256 A1 and U.S. Pat. No. 5,502,567 therefore proposed a very small, very fast polarimeter without moving parts. It is based on a polarizing film system, which is deposited on the surface area of a glass cone. The coated cone is then arranged along the optical axis of the system via a circular detector array to produce a unique allocation of angle sectors of the polarizing cone and the detector elements. This device is very small, avoids any movement and can be read out very quickly due to its parallel mode of operation.

A disadvantage, however, is the strict monochromasy of this cone polarimeter because the polarizing film system is a narrow-band filter that has the desired selectivity for polarization only in a very narrow spectral range. Spectral applications or a change to other wavelengths than the design wavelength are thus excluded.

A further disadvantage is the technically complex production of the polarizing film system. Coating, for example, must take place at a very steep angle. Furthermore, very high homogeneity of the film parameters on the surface area is required. These requirements cannot be satisfied with standard coating lines, which are laid out for vertical coating geometries.

A further disadvantage is that this device permits only two polarization parameters (ellipticity and azimuth) to be measured. To determine the complete set of Stokes parameters requires additional measurements with the inclusion of retarders, as discussed, for example, in P. S. Hauge "Recent Developments in Instrumentation in Ellipsometry." Surface Science, 96 (1989) 108–140.

Furthermore, EP 0 632 256 A1 and U.S. Pat. No. 5,502,567 propose a variant for miniature polarimeters based on a circular arrangement of metal grids. In practice, only polarization degrees of 3 were obtained. These low values are not sufficient for applications in quantitative polarimetry where components with polarization degrees>10,000 are typically used to achieve high measuring accuracy.

The cause of the relatively low degree of polarization in grid polarizers is the selective reflection of the components of the electric field oscillating parallel to the grid lines. Since this is thus a surface effect, only a finite degree of polarization can be achieved per unit area. At a wave length of 670 nm, for example, a theoretically obtainable degree of polarization of approximately 100 was determined for a grid with a grid constant of 100 nm. Such a grid, which is produced by electron lithography, supplies practically only values of 2 to 3 (see B. Stenkamp et al, "Grid Polarizer for the Visible Spectral Region."SPIE Proceedings Vol. 2213).

The theoretically possible polarization degree of grid polarizers largely depends on the proportion of the grid constants to the wavelength. For an optimum effect, the wavelength should be greater than the grid constant. In the visible spectrum, this means grid constants of less than 100 nm, which are difficult to produce. Thus, to realize this device requires the use of electron beam lithography in conjunction with highly complex thin film processes. Both are connected with very high costs. Until now, such grid polarizers have therefore been produced primarily for applications in the infrared region where conventional photolithography with a resolution of approximately 1 $\mu$m may be used for wavelengths of some 10 $\mu$m to 100 $\mu$m.

Furthermore, EP 0 632 256 A1 and U.S. Pat. No. 5,502,567 proposed a variant based on polarizing waveguides, which perpendicularly open onto the detector surfaces. This variant theoretically supplies a very high degree of polarization, but the disadvantage is the extremely low transmission of this device, which is to be expected due to the low degree of area filling and the high coupling losses connected with coupling the wave into the waveguide. U.S. Pat. No. 4,158,506 discloses a device with 6 rectangular analyzer elements arranged side by side with predetermined polarization direction, with 2 of the elements occurring twice and furthermore being provided with a $\lambda/4$ plate. The principle on which the analyzer elements are based, whether they are, for example, grids or the like, is not specified.

The asymmetry of the device, however, has serious disadvantages in practical application. For applications in ellipsometry, well collimated beams are used. The intensity distribution, however, is always in-homogenous. It typically fades toward the outside and is frequently Gaussian in shape. If such a beam strikes the 6-segment arrangement proposed in U.S. Pat. No. 4,158,506, the resulting signal distribution in the detectors depends not only on the polarization state but also on the position of the axis of the beam at the surface of entry. This means that those detector elements that are near the beam axis, receive greater intensity than other more remote detector elements. The analysis methods proposed in U.S. Pat. No. 4,158,506 therefore lead to large systematic errors. The only practicable option is to use an additional lens to expand the beam far enough so that only a very small and thus largely homogenous segment of the crest of the beam axis is reproduced on the device. This is connected with additional complexity and a significant loss in intensity, however, which is justified only in very powerful impulse lasers so that applications of this device have not become known thus far.

DE 44 42 400 A1 discloses a sensor to determine position in space, which has a cone that refracts a beam and a cylindrical transition element that is arranged on a detector array. The cone may be provided with an interference film system to separate the beam from parasitic radiation. The polarization of the beam cannot be measured with this device.

SUMMARY OF THE INVENTION

The purpose of the invention is to create a micropolarimeter without moving parts that has a high polarization index, can be used for polychromatic light, is so small that it can detect the beam of common lasers in a single measurement step without requiring additional enlargement, and that it can be easily converted into a complete Stokesmeter.

DETAILED DESCRIPTION OF THE INVENTION

This purpose is attained by a micropolarimeter wherein the analyzer comprises a radially symmetrical flat disk made of a polarizing material, wherein the polarization is based on absorption effects within the material with the surface of the analyzer (1) being>= the surface of the detector segments.

Such polarizing materials are known per se (see Thomas P. Seward III "Glass Polarizers Containing Silver," SPIE Proceedings, Vol. 464, 1984).

The use of such polarizing materials for analyzer segments in a micropolarimeter with no moving parts, however, has not been considered until now. Furthermore, the mechanical processing of such polarizing materials, particularly the production of precise blanks required by the invention, is very labor intensive.

To produce segments for a micropolarimeter, microengineering processes are preferably used in order to obtain the optical quality of the analyzer employed. With the dimensions used, in contrast to macroscopic blanks, the quality of the cut edges plays an important role. Poor quality of the edges would cause scattering and thus depolarization, i.e., it would decrease the degree of polarization. The cut edges should therefore only have irregularities of less than 10 $\mu$m.

This is balanced, however, by a series of advantages that make the micropolarimeter a high-precision device that is universally applicable. This includes, in particular, independence from the incident wavelength and the high degree of polarization inherent in these materials. In these polarizing materials, nanometer-sized particles are aligned macroscopically along the desired optical axis and are fixed in the organic or inorganic matrix. Preferably, this is a polarizing material that contains nanometer-sized particles with strong anisotropy of the optical conductance. Advantageously, the polarizing material is glass with embedded silver particles.

The analyzer disk according to one embodiment can be made as one piece with the polarization direction oriented radially or tangentially. According to another embodiment, the analyzer disk has $N_A$ segments where $N_A = N_D$. The segments may be sectors or planar structure of some other shape, such as, for example, rectangular or oval segments. The segments may also be spaced at a distance from each other.

Each segment of the analyzer is preferably made of a triangular or trapezoidal blank of a polarizing material in which polarization is based on absorption effects within the material.

The segments of the analyzer disk do not necessarily have to have a radial or tangential polarization direction. The polarization direction of each segment may form an angle $\alpha$ with the corresponding bisector of the segment, where $0° <= \alpha <= 180°$.

Opposite segments preferably have the same polarization direction.

To obtain as high a polarization degree as possible, the thickness of the polarizing material ranges from 50 $\mu$m to 2 mm.

In these polarizers, in contrast to the known grid polarizers, extinction of the one field component of the light wave is not based on surface reflection but on selective absorption in the nanoparticles. Distribution within the volume of the matrix also permits clearly higher polarization values because the absorbed energy depends on the number of absorption centers or on the material thickness that is passed through.

The micropolarimeter is preferably designed such that in principle a circularly symmetrical arrangement is used on the input side, which corresponds to the beam geometry and intensity distribution present in lasers or collimated white light sources. Thus, the $N_A$ segments of the analyzer are preferably arranged in a circle.

The polarization measurement supplies meaningful results if the beam axis coincides with the axis of symmetry of the polarimeters. This is preferably achieved by providing an even number of $N_{A,D}$ of identical segments. With correct adjustment of the beam axis to the axis of symmetry, opposite segments will then produce identical signals and will do so independently of polarization. Thus, in contrast to U.S. Pat. No. 4,158 506, it is now possible to separate the geometric information from the polarization information even in the case of Gaussian beams. The device according to the invention is thus not only a polarimeter but at the same time also a sensor to determine the correct adjustment of the device in the beam path. The analyzer must comprise at least three segments of different polarization to determine two polarization properties—ellipticity and azimuth—as well as the intensity. With the additional use of retarders ($\lambda/4$ or $\lambda/2$ plates) in some elements, other Stokes parameters may also be determined such as the sense of rotation of the field strength vector and the degree of polarization. Using more elements than are required to determine polarization makes it possible to improve the signal-to-noise ratio of the measurement.

After passing through the elements of the analyzer, the N information must be supplied uniquely and without crosstalk to the $N_D$ segments of the detector array. According to a first embodiment, the blanks are attached to the segments of the detector by means of a transparent adhesive.

If the size or shape of the segments of the analyzer and the detector differ, a beam converter should preferably be provided.

A beam converter adapts the beam cross section between analyzer and detector array to ensure a crosstalk-free unique allocation, which is optimal for detection.

According to a special embodiment, the segments of the detector are rectangular, the segments being arranged side by side in a line or in rows and columns. Between the $N_A$ segments of the analyzer and the $N_D$ segments of the detector waveguides may be arranged. Preferably, a pressed waveguide bundle adapted to the shape of the analyzer sector and detector segment is arranged per segment as a beam converter.

It is also possible to provide a gradient index lens between the analyzer and the detector.

Due to the fact that not electrical fields but their intensities are detected, an ordinary PSA ellipsometer (Polarizer Sample Analyzer) is not capable of distinguishing between left-handed and right-handed circularly polarized states. This ambiguity of the results can be eliminated by inserting other optical components in the beam path. A λ/2 plate is frequently used for this purpose, which is arranged between the input polarizer and the sample in such a way that right-handed or left-handed circularly polarized light is produced. By comparing two measurements—once with linear (45° to p-s coordinate system) and once with circularly polarized light—it is possible to distinguish between left-handed and right-handed circular.

This method cannot be used for the micropolarimeter according to the invention since it impairs both the measuring time and the measuring accuracy. Furthermore, to obtain redundant segments on the detector that permit position detection, an additional array, which in the simplest case comprises two plates of a birefringent material with a known phase shift δ, is placed in front of the analyzer. λ/4 plates, in which one of the major axes is less than 45° to the p-s coordinate system, are preferred. The analyzer segments that are not covered with birefringent material then continue to supply redundant polarization information and, in case of maladjustment, a position signal, while the pairs covered with birefringent plates, in the adjusted state, supply the information on the handedness of the polarization state. The sum of all signals from the individual segments can furthermore be interpreted as an intensity signal that is proportional to the total intensity even in case of partially polarized light, based on which the complete Stokes vector can be determined in a single measuring step.

With a circular analyzer and detector, a problem may occur with Gaussian intensity distribution of the beam because the intensity of the Gaussian beam falls into the center of the analyzer or detector array where the segment-shaped elements become very insensitive or the detector has a blind central area. In contrast, the edge area, which represents the optimal analyzer and detector area, is illuminated only by the outer branches of the Gaussian bundle. By placing a suitable beam converter in front of the analyzer, the intensity distribution on the analyzer and detector surface can be advantageously influenced.

The use of a preconnected beam converter also improves adjustment since otherwise an angle-related maladjustment cannot be separated from a mere lateral shift. Such a preconnected beam converter is essentially to perform two functions:

redistribute the intensity of the beam to provide good illumination of the analyzer and the detector form a sensitive adjustment signal for the alignment of the beam axis to the symmetry axis of the sensor.

This is achieved whenever the beam converter represents an "aperture-detector" arrangement. If the beam axis is tilted, the image on the analyzer migrates, which can easily be shown by comparing the intensities on the opposite analyzer or detector surfaces.

For the preconnected beam converter, convex, plano-convex, concave and plano-concave lenses, transparent cones, lens arrays, Fresnel lenses or gradient index lenses are preferably used.

The diameter of the beam converter is preferably equal to the diameter of the analyzer.

The detector segments may be arranged on a signal conditioning chip or integrated in such a chip.

On the detector plane—after the light has passed through the $N_A$ segments of the analyzer—n polarization information is present, all of which must be read out in parallel, i.e., simultaneously, so that the maximum speed of the micropolarimeter can be used, whereby the polarization functions are crosstalk-free between the individual segments. Only parallel readout of all segments at defined instants makes it possible to track fast-changing signals. In our device, this problem is solved by means of a special diode array that is made in such a way that a photon, which was absorbed in diode m, can contribute to a current only in this diode and not—based on diffusion processes—in one of the adjacent diodes. Since the currents produced during optoelectronic conversion are so low that they require preamplification and impedance conversion in the immediate vicinity of the detector, the signals, due to the electronic behavior of the detector diodes, cannot be transmitted over conductor lengths greater than approximately 10 cm. These requirements are satisfied by an array of n preampfliers that are integrated in the printed circuit board in highly compact manner and in closest proximity to the diodes; for example, in chip-on-wire technology. This results in an optoelectronic detector that satisfies all the requirements of the polarimeter and is sufficiently small so that it does not impair the advantages of the compact design of the micropolarimeter.

For the detector, it is also possible to use a CCD chip that has no predefined division into segments. Only in subsequent signal processing, the information read via the pixels may be electronically allocated to corresponding segments.

Exemplary embodiments are discussed below by means of the drawings.

Figure 1B:
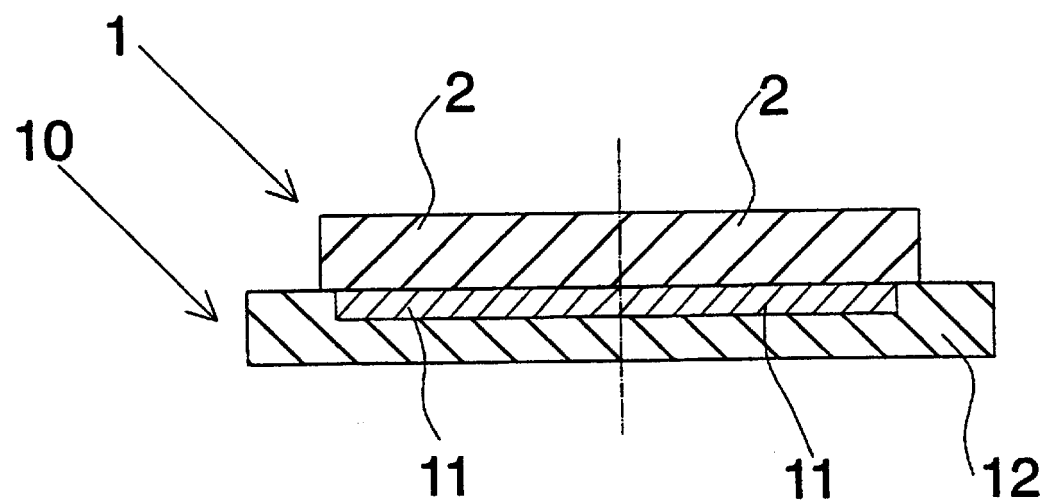
Figure 1C:
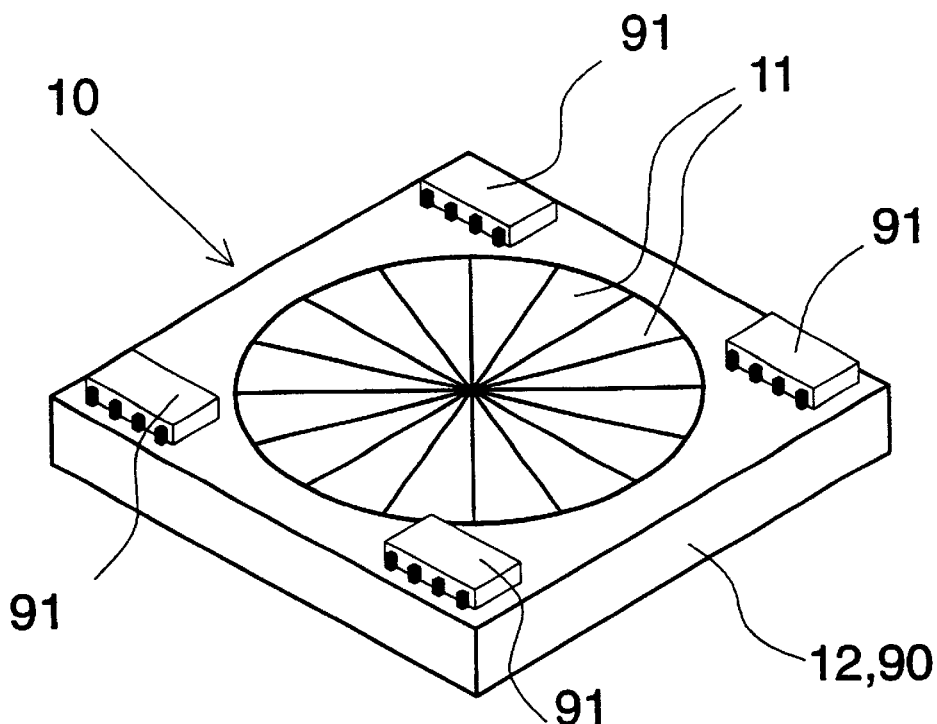
Figure 1D:
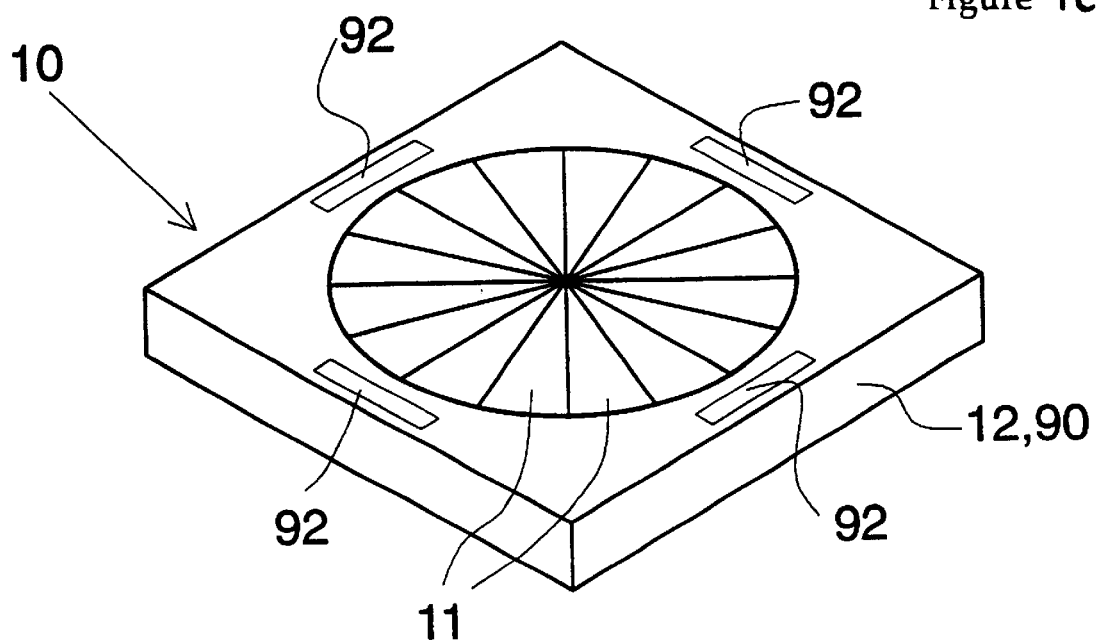
Figure 1E:
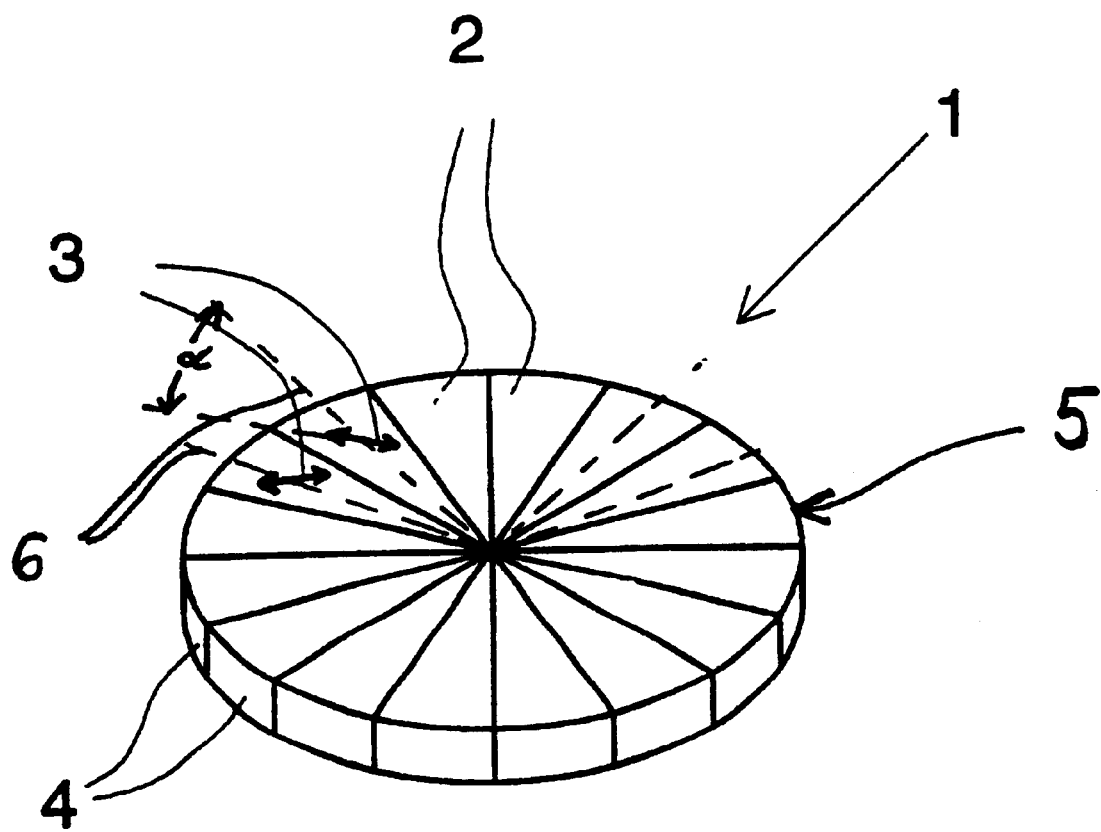
Figure 2:
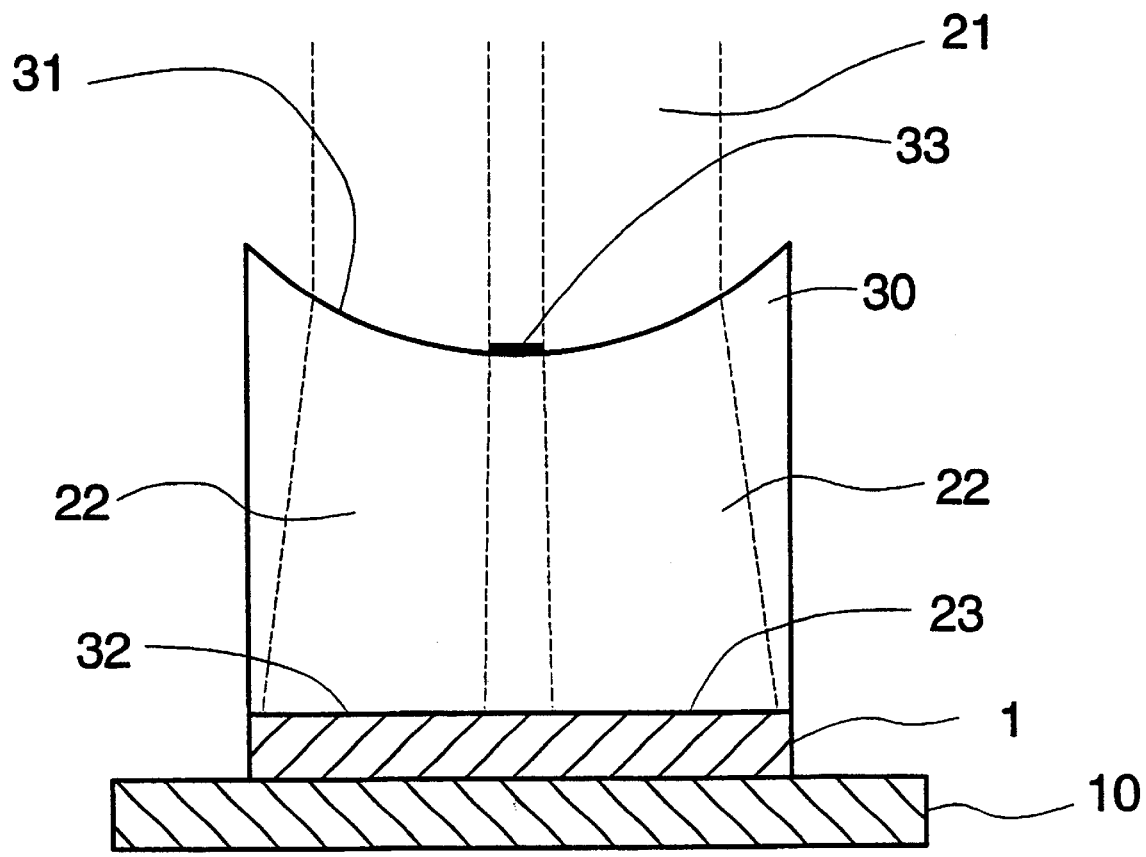
Figure 3:
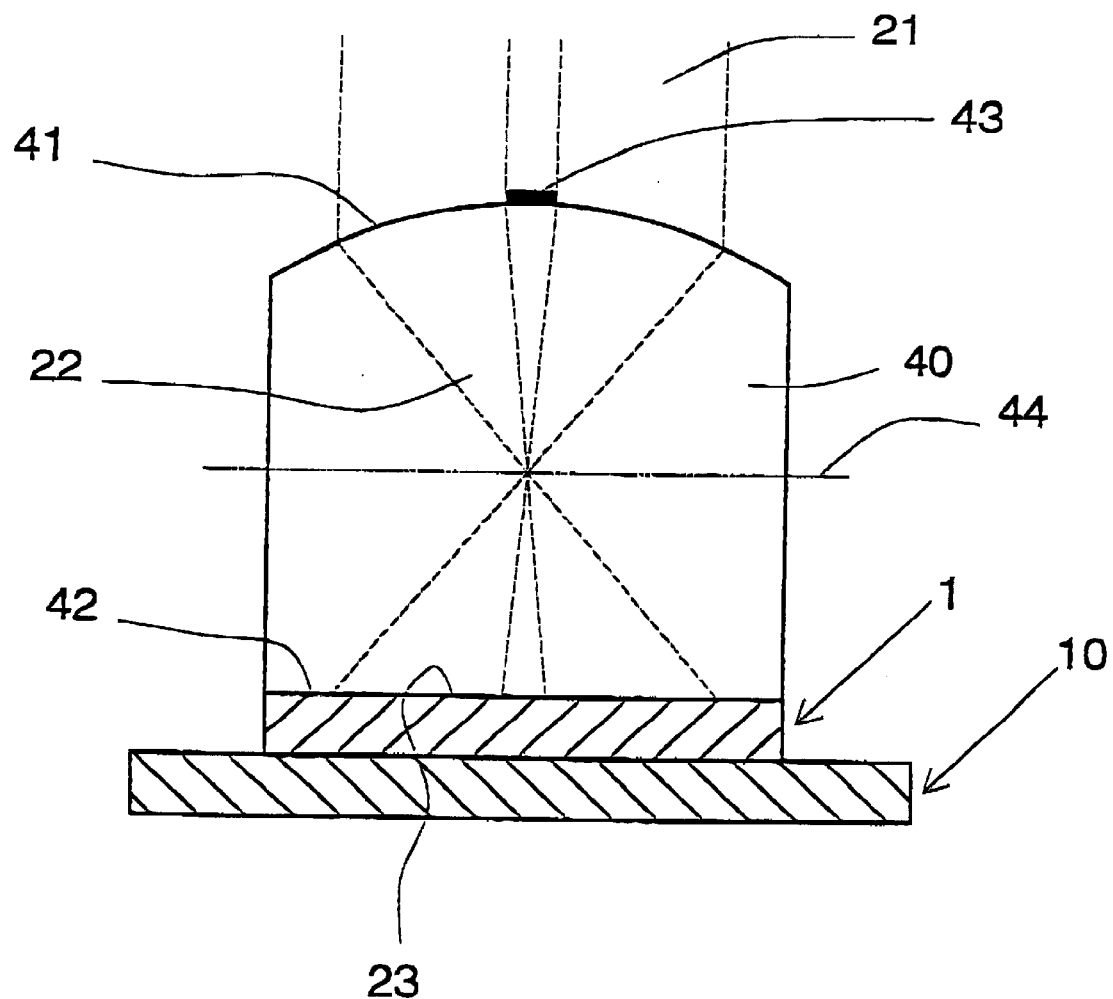
Figure 4:
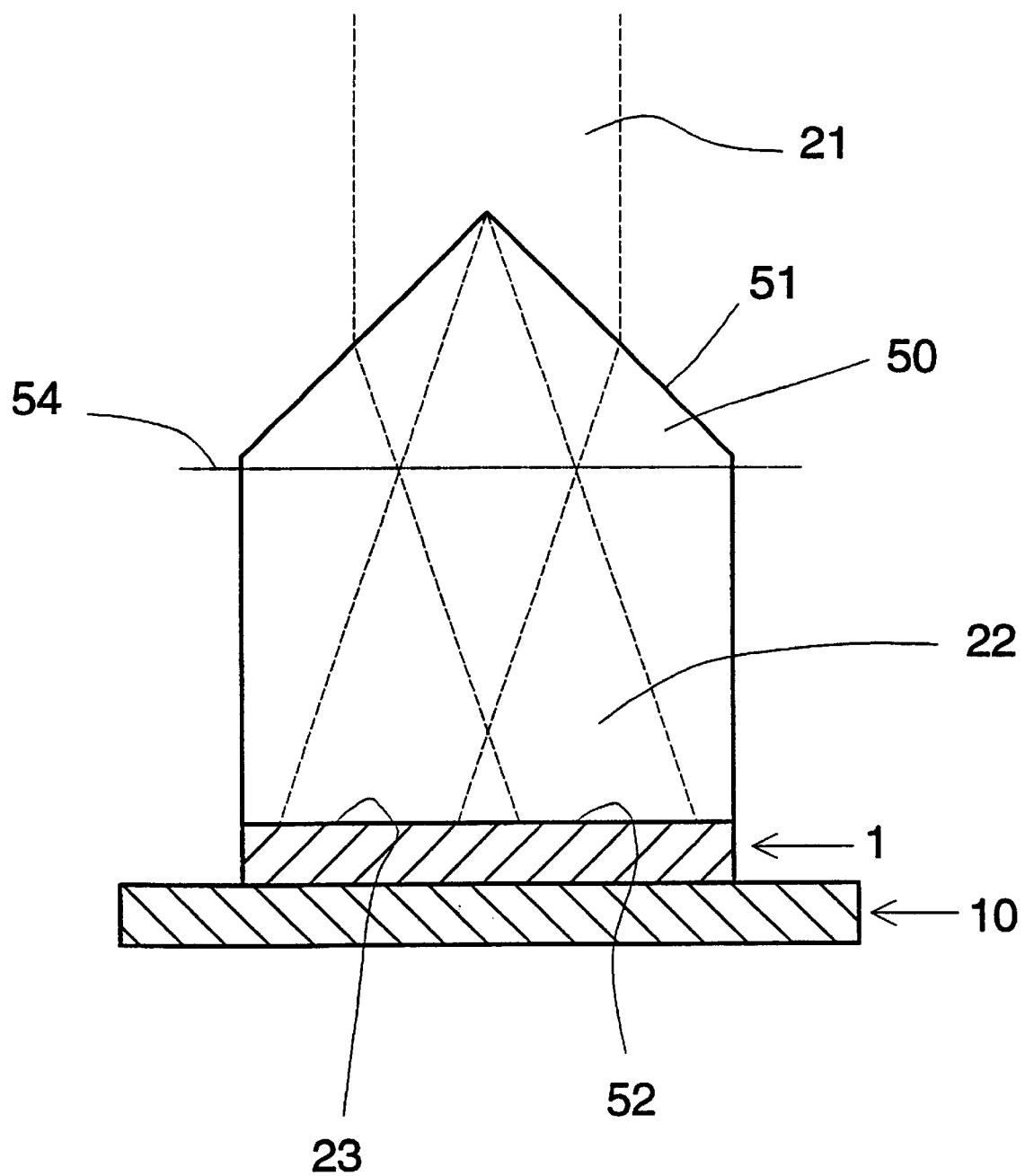
Figure 5:
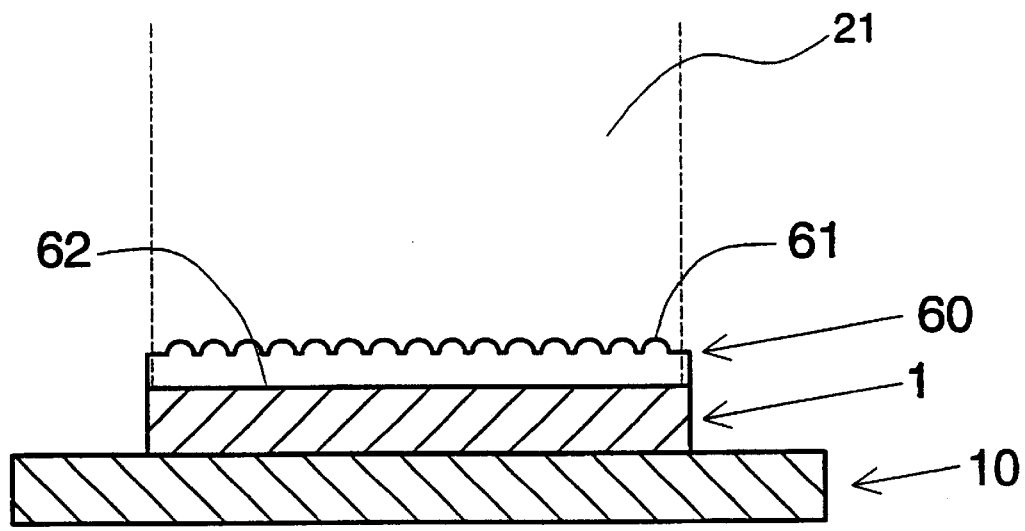
Figure 6:
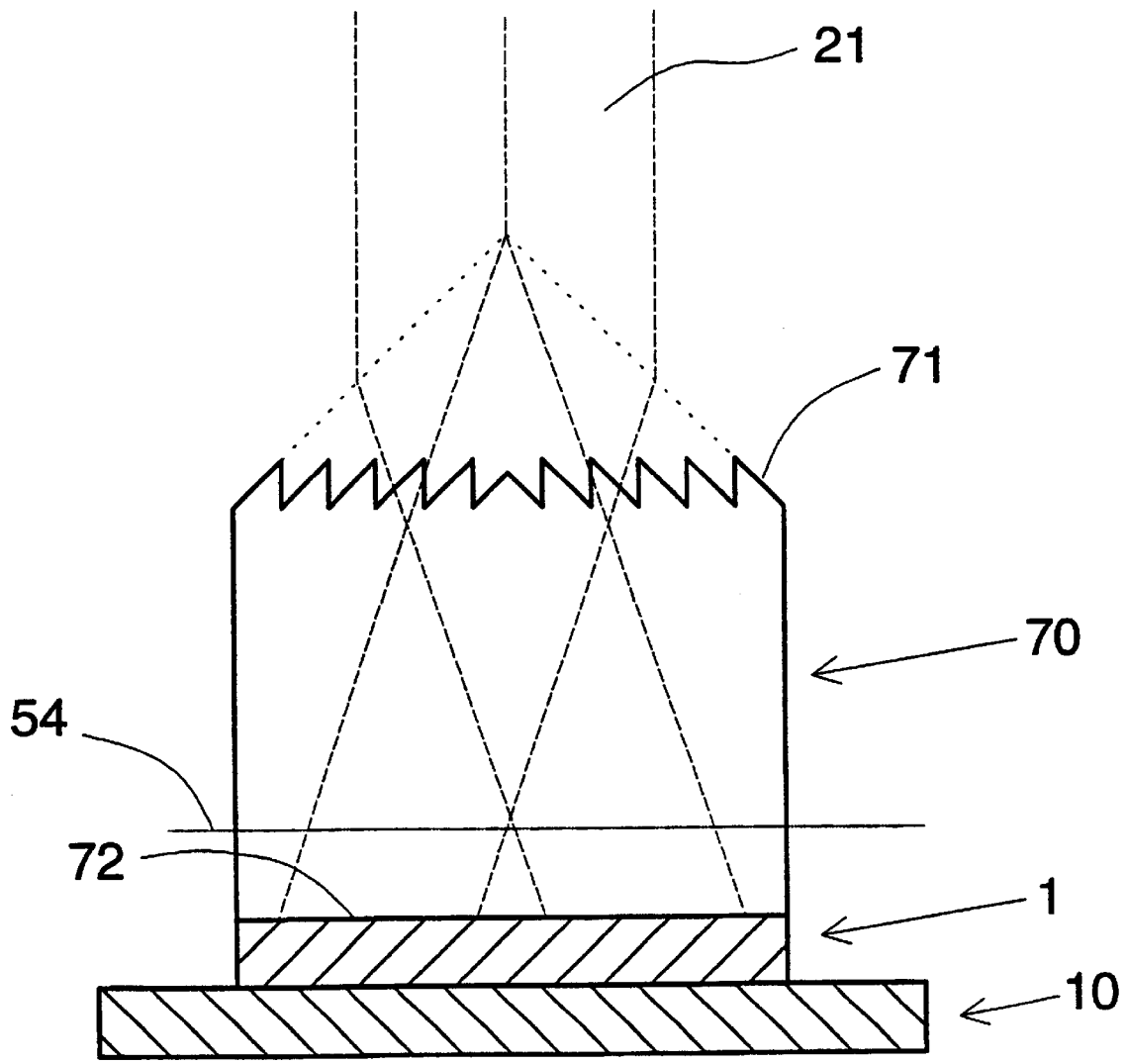
Figure 7:
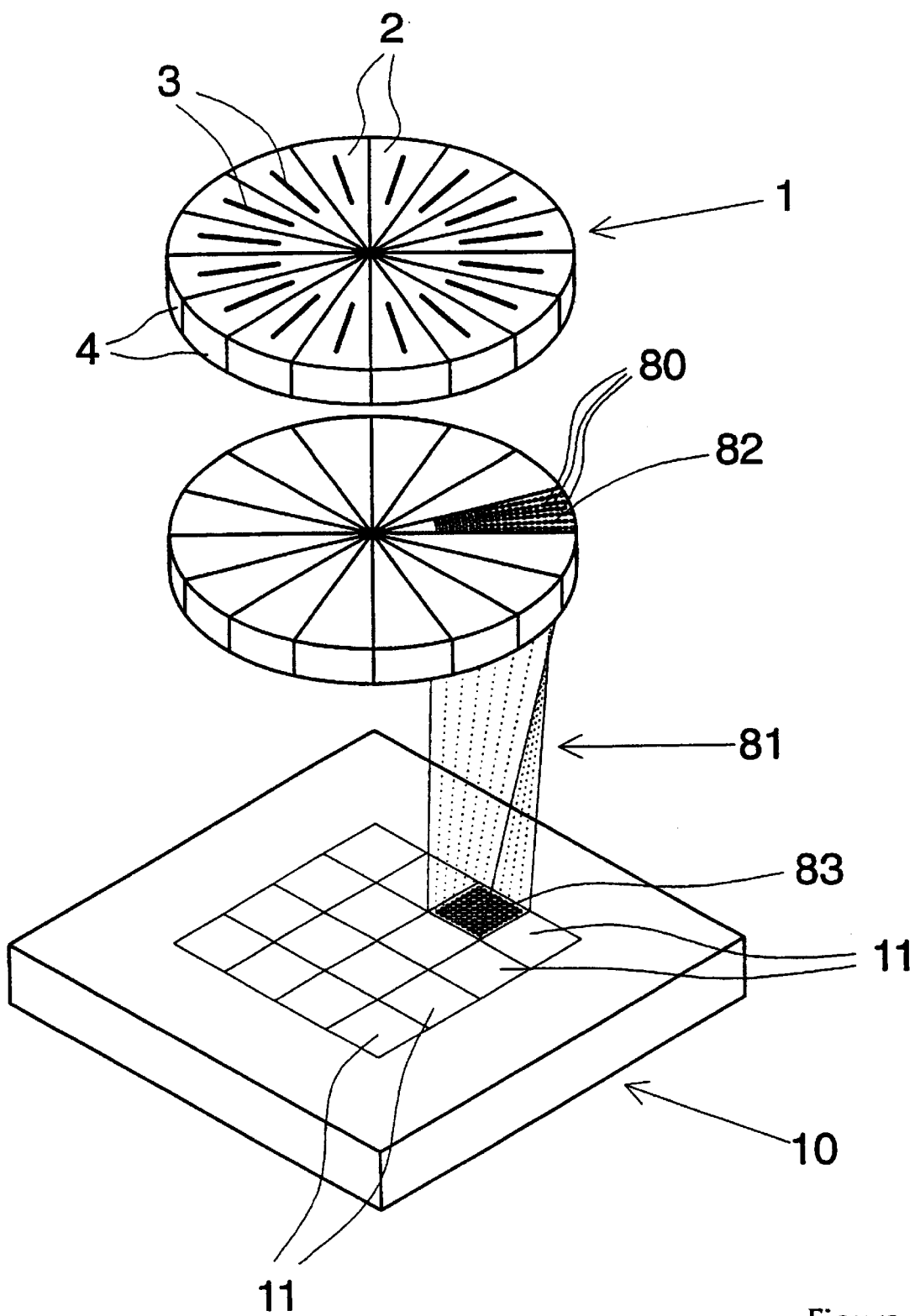
Figure 8:
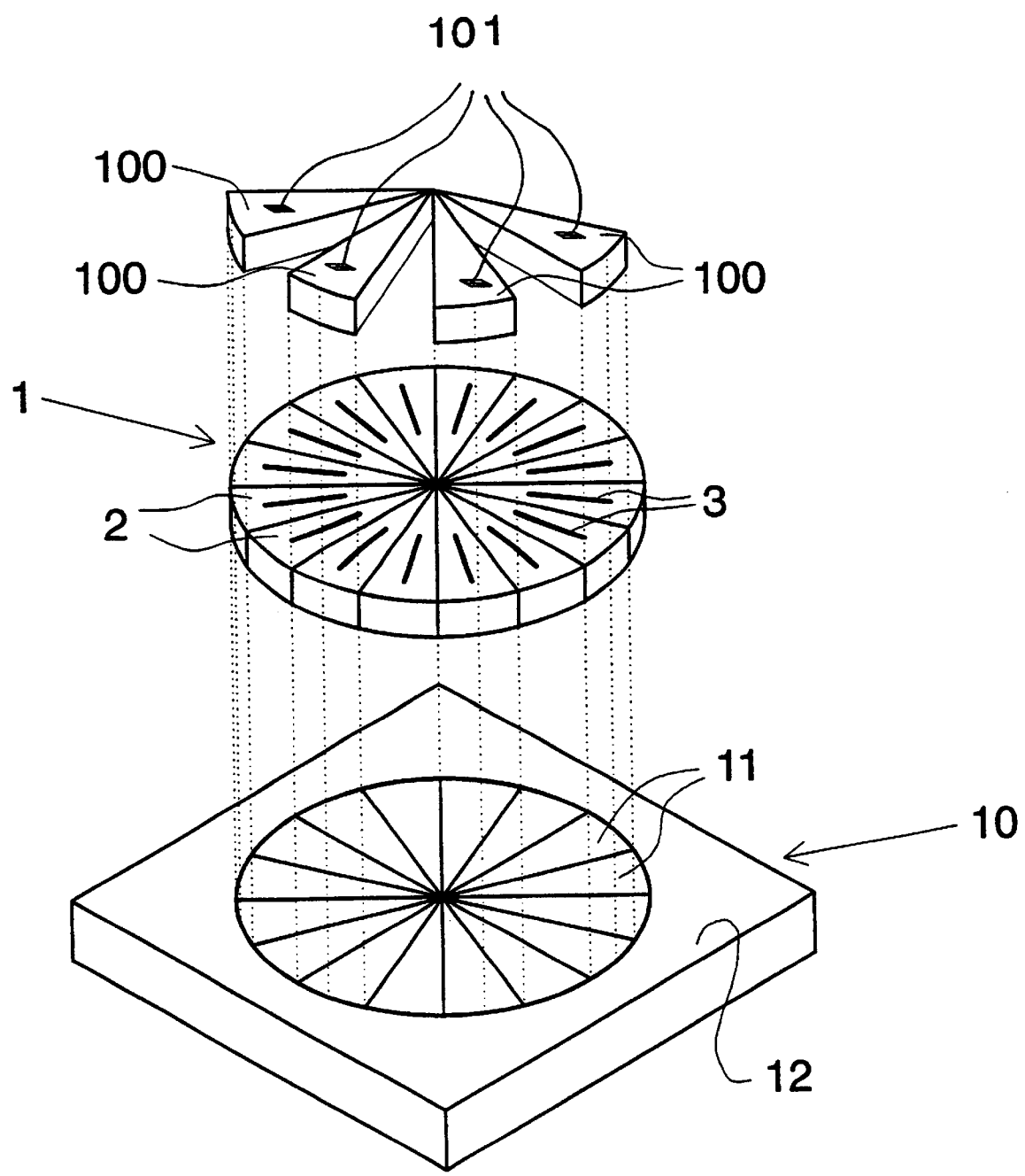

The following show:

FIG. 1a a perspective view of an analyzer and a detector,

FIG. 1b a vertical section through the analyzer and detector shown in FIG. 1a,

FIGS. 1c, d perspective views of the detector chip,

FIG. 1e an analyzer according to an additional embodiment,

FIG. 2 a section through a micropolarimeter with a preconnected plano-convex lens, FIG. 3 a vertical section through a micropolarimeter with a preconnected plano-convex lens, FIG. 4 a vertical section through a micropolarimeter with a preconnected transparent cone, FIG. 5 vertical section through a micropolarimeter with a preconnected lens array, FIG. 6 a vertical section through a micropolarimeter with a preconnected Fresnel lens, FIG. 7 the perspective view of a beam converter in the form of a beam waveguide bundle between analyzer and detector, and FIG. 8 a Stokesmeter.

FIG. 1a depicts an analyzer 1 with a circular arrangement of segments 2, which together form a disk 5. Each segment comprises a blank 4 of a polarizing material whose polarization effect is based on absorption effects within the polarizing material. The polarization direction is radial and is identified by the reference number 3. Below analyzer 1 there is a detector 10 that has the same number of segments 11, which are arranged on a detector chip 12. The arrangement of these segments is also circular. Segments 11 are identical and can be read out independently from each other. With correct adjustment, each of the opposite detector segments 11 supplies identical signals. In FIG. 1a, analyzer 1 is not yet connected with detector 10.

In FIG. 1b, analyzer 1 is connected with detector 10 via a transparent layer of adhesive.

In FIG. 1c, detector chip 12 is shown as a hybrid signal conditioning chip 90 with added IC amplifier components 91 and in FIG. 1d as a monolithic chip with integrated amplifier circuit 92.

FIG. 1e depicts a disk 5 composed of segments 4 in which the polarization direction 3 forms an angle α with the corresponding bisector 6 of segments 2.

FIG. 2 shows a section through such a micropolarimeter comprising analyzer 1 and detector 10, also in sectional view, with a preconnected beam converter 30 in the form of a plano-concave lens 30. The concave surface 31 is facing beam 21 to be analyzed, while the flat surface 32 is supported against the upper side of analyzer 1. Due to the concave curvature of beam converter 30 and the aperture 33 arranged in the center, beam 22 is refracted toward the outside and is thus kept away from the insensitive central area of the analyzer and detector. If the input beam 21 is a beam with circular cross section, an annularly lighted area 23 with a dark region in the center is obtained on the analyzer.

If there is a maladjustment, i.e., if the axis of beam 21 is not parallel to the normal of the detector surface, a deformed lighted area 23 is obtained, which is shown by the measured intensity of the detector segments. Based on the intensity values, a precise adjustment can be made.

FIG. 3 shows a corresponding arrangement with a plano-convex lens 40. The flat surface 42 is supported against the analyzer while the convex surface 41 is facing beam 21 to be analyzed. Here, too, an aperture 43 is arranged in the center. The curvature and the thickness of the lens are selected such that the focal plane 44 extends approximately midway between convex surface 41 and flat surface 42. As a result, the incident beams are refracted so strongly that they are directed to the corresponding opposite side of the analyzer. In this arrangement, too, a circular lighted area 23 is obtained on the surface of the analyzer while the center of the analyzer and thus the center of the detector remain dark.

FIG. 4 shows an additional embodiment with a cone 50. The conical surface 51 is facing toward beam 21 to be analyzed while the flat surface 52 is supported against the surface of the analyzer. Plane 54 in which the beam's cross extends within cone 50 so that the incident beams are refracted onto the corresponding opposite side. In this embodiment, too, an annular lighted area 23 is obtained on the upper side of the analyzer.

FIG. 5 shows an additional embodiment by means of a lens array 60. The lens arrangement 61 is facing beam 21 to be analyzed while the flat surface 62 is supported against the upper side of analyzer 1.

FIG. 6 depicts an additional embodiment with a Fresnel lens 70. The lens surface 71 is facing beam 21 to be analyzed, while the flat surface 72 is supported against the upper side of analyzer 1.

FIG. 7 shows an embodiment with a converter between analyzer 1 and detector 10. The analyzer array has a circular arrangement of triangular segments 2 while the detector array has rectangular segments 11 arranged side by side. To transform the triangular analyzer segments onto the rectangular detector segments 11, a beam converter 81 comprising a plurality of optical waveguides is provided. The entrance surface 82 corresponds to the form and size of a segment of the analyzer while the exit surface 83 corresponds in shape and dimension to a segment surface 11 of the detector. This arrangement has the advantage that commercially available detector rows or detector arrays may be used.

FIG. 8 shows a complete Stokesmeter which, in addition to the structure of FIG. 1a, has four alternating λ/4 plates 100 arranged in front of analyzer 1 the direction of major axis 101 of which is the same for all λ/4 plates 100.

What is claimed is:

1. Micropolarimeter with an analyzer made from a polarization material, whose polarization is based on absorption effects within the material, and with a detector arranged behind the analyzer in the beam direction, and having a number of segments $N_D \geq 3$ wherein the surface of the analyzer is $\geq$ the segment surface of the detector, characterized in that has a single circular arrangement of segments and forms a circular-symmetrical, flat disk.

2. Micropolarimeter as claimed in claim 1, characterized in that the analyzer disk (5) is made as one piece and the polarization direction is radially or tangentially aligned.

3. Micropolarimeter as claimed in claim 1, characterized in that the analyzer disk (5) has $N_A$ segments (2) where $N_A = N_D$.

4. Micropolarimeter as claimed in claim 3, characterized in that each segment (2) is formed of a triangular or trapezoidal blank (4) of the polarizing material.

5. Micropolarimeter as claimed in claim 3, characterized in that the polarization direction of each segment (2) of the analyzer disk (5) forms an angle α with the corresponding bisector (6) of the segment (2), where 0°<=α<=180°.

6. Micropolarimeter as claimed in claim 5, characterized in that opposite segments (2), respectively, have the same polarization direction.

7. Micropolarimeter as claimed in claim 1, characterized in that the polarizing material comprises nanometer-sized particles with strong anisotropy of the optical conductance.

8. Micropolarimeter as claimed in claim 1, characterized in that the polarizing material is a polarizing film or a glass with embedded silver particles.

9. Micropolarimeter as claimed in claim 1, characterized in that the thickness of the polarizing material ranges from 50 μm to 2 mm.

10. Micropolarimeter as claimed in claim 3, characterized in that the analyzer (1) has an even number $N_A$ of segments (2).

11. Micropolarimeter as claimed in claim 4, characterized in that the blanks (4) on the segments (11) of the detector (10) are attached by means of a transparent adhesive (20) and that the blanks have the same shape as the segments (11) of the detector (10).

12. Micropolarimeter as claimed in claim 4, characterized in that
   the segments (11) of the detector (10) are rectangular,
   the segments (11) are arranged linearly or in rows and columns side by side,
   and that between the $N_A$ segments (2) of the analyzer (1) and the $N_D$ segments (11) of the detector (10) waveguides (80) are arranged.

13. Micropolarimeter as claimed in claim 12, characterized in that a pressed waveguide bundle (81) adapted to the shape of the analyzer segment (2) and detector segment (11) is arranged per segment (2,11).

14. Micropolarimeter as claimed in claim 3, characterized in that in front of at least two analyzer segments (2) one plate each of a birefringent material with known phase shift δ, preferably a λ/4 plate (100), is arranged.

15. Micropolarimeter as claimed in claim 1, characterized in that a beam converter is arranged in front of the analyzer (1).

16. Micropolarimeter as claimed in claim 15, characterized in that the beam converter comprises at least one convex lens (40).

17. Micropolarimeter as claimed in claim 16, characterized in that the convex lens (40) is a plano-convex lens the flat surface (42) of which is facing toward the analyzer (1).

18. Micropolarimeter as claimed in claim 16, characterized in that the flat surface (42) lies behind the focal plane (44) in radiation direction.

19. Micropolarimeter as claimed in claim 15, characterized in that the beam converter comprises at least one concave lens (30).

20. Micropolarimeter as claimed in claim 19, characterized in that the concave lens (30) is a plano-concave lens the flat surface (32) of which is facing toward the analyzer (1).

21. Micropolarimeter as claimed in claim 15, characterized in that the beam converter comprises a transparent cone (50).

22. Micropolarimeter as claimed in claim 21, characterized in that the inclination of the conical surface (51) is so great that the base (52) of the cone lies behind a plane (54) in radiation direction in which the light beams cross.

23. Micropolarimeter as claimed in claim 15, characterized in that the beam converter comprises a lens array (60), a Fresnel lens (70) or gradient index lens (73).

24. Micropolarimeter as claimed in claim 15, characterized in that the diameter of the beam converter is greater/equal to the diameter of the analyzer (1).

25. Micropolarimeter as claimed in claim 1, characterized in that the detector segments (11) are arranged on a signal conditioning chip or are integrated in the signal conditioning chip (90).

26. Micropolarimeter as claimed in claim 1, characterized in that the detector (10) is a CCD chip the pixels of which are electronically coupled to $N_D$ segments.

* * * * *

UNITED STATES PATENT AND TRADEMARK OFFICE
CERTIFICATE OF CORRECTION

PATENT NO. : 6,268,915 B1
APPLICATION NO. : 09/485111
DATED : July 31, 2001
INVENTOR(S) : Abraham et al.

It is certified that error appears in the above-identified patent and that said Letters Patent is hereby corrected as shown below:

Column 8,
Line 3, after "in that", add -- the analyzer (1) --.

Signed and Sealed this

Twenty-fifth Day of July, 2006

JON W. DUDAS
*Director of the United States Patent and Trademark Office*